United States Patent [19]

Franke et al.

[11] 4,425,788
[45] Jan. 17, 1984

[54] COMBUSTION MONITORING SYSTEM FOR MULTI-CYLINDER INTERNAL COMBUSTION ENGINE

[75] Inventors: Horst Franke, Löchgau; Ernst Linder, Mühlacker; Winfried Moser, Markgröningen; Klaus Muller, Tamm; Franz Rieger, Aalen, all of Fed. Rep. of Germany

[73] Assignee: Robert Bosch GmbH, Stuttgart, Fed. Rep. of Germany

[21] Appl. No.: 344,407

[22] Filed: Feb. 1, 1982

[30] Foreign Application Priority Data

Feb. 25, 1981 [DE] Fed. Rep. of Germany ....... 3106993

[51] Int. Cl.³ ............................................. G01L 23/22
[52] U.S. Cl. ...................................... 73/35; 250/578
[58] Field of Search ................... 73/35; 356/311, 315; 250/227, 578, 215; 123/425, 435

[56] References Cited

U.S. PATENT DOCUMENTS

| | | | |
|---|---|---|---|
| 2,607,215 | 8/1952 | De Boisblanc | 73/35 |
| 2,841,979 | 7/1958 | Harbert | 73/35 |
| 3,517,247 | 6/1970 | Szilagyi | 73/35 X |
| 3,981,592 | 9/1976 | Williams | 250/227 |

Primary Examiner—James J. Gill
Attorney, Agent, or Firm—Frishauf, Holtz, Goodman, Woodward

[57] ABSTRACT

To permit individual evaluation of the combustion processes in the respective cylinders (1a–d) of an internal combustion (IC) engine (2), individual optical pick-ups (3a–d; 4a–d) are coupled to the respective cylinders, the output signals either in optical or electrical form are conducted to separate pick-ups for individual evaluation or, alternatively, the output signals are combined and then again separated out by a steering circuit. Individual evaluation can be accomplished by locating light guide fibers from the sensors in a predetermined position with respect to opto-electrical transducers; by forming scanning windows, for example by a rotating disk (19, 20) rotating n in synchronism with the engine and permitting passage of light from the respective fibers of the light guides to respective pick-ups; or by combining the light outputs from the respective sensors (4) either optically by intermixing light guide fibers in a common cable (6'), or electrically in an equivalent OR-circuit (FIG. 8: $R_L$) with subsequent correlation of the output signal with a specific cylinder by a scanning disk (FIG. 6: 20) with suitably placed openings (22a–d) therein, or an electrical time-multiplex steering circuit (FIG. 8: 30) operating in synchronism with rotation of the engine.

13 Claims, 9 Drawing Figures

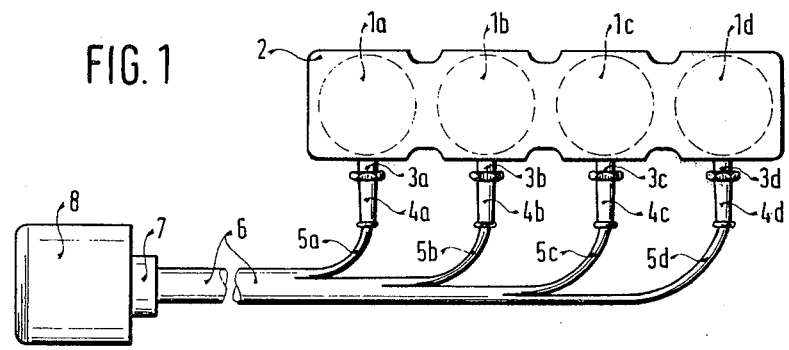
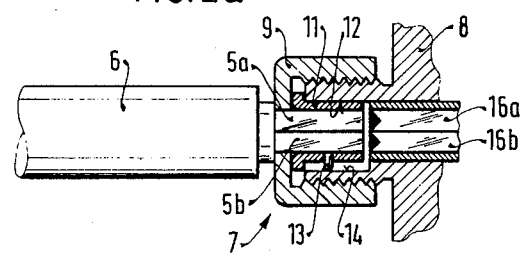
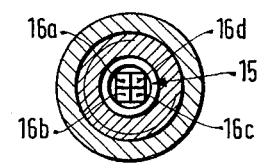
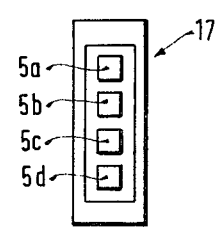
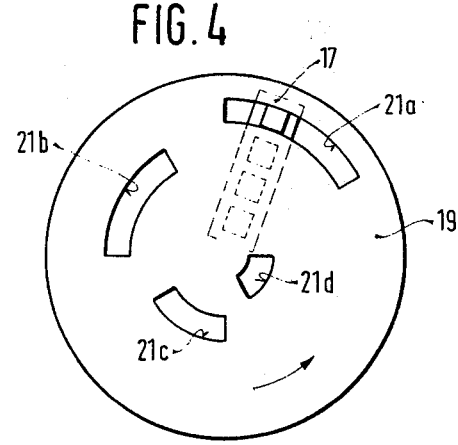

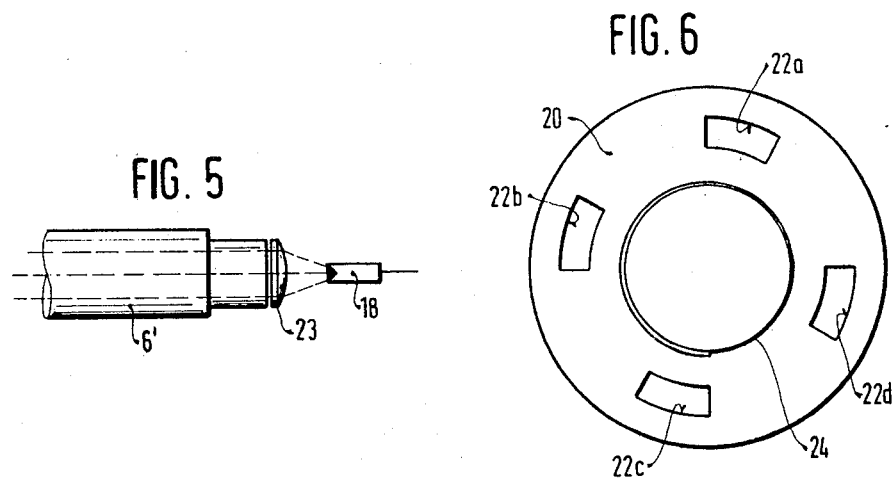
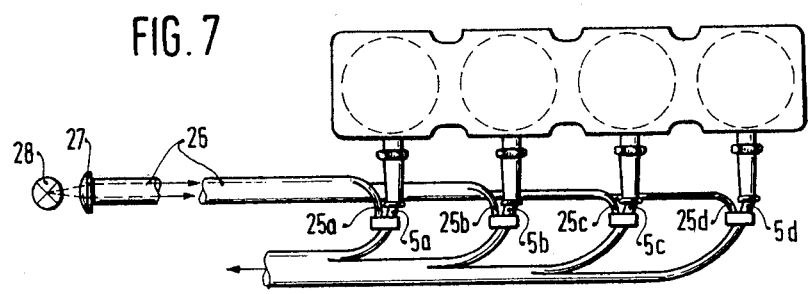
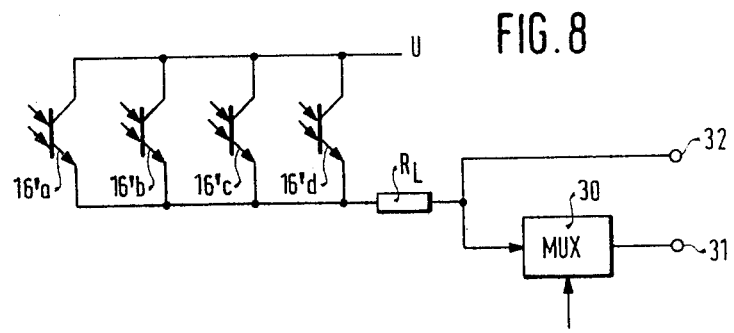

COMBUSTION MONITORING SYSTEM FOR MULTI-CYLINDER INTERNAL COMBUSTION ENGINE

Reference to related application, assigned to the assignee of this invention: U.S. Ser. No. 06/214,481, filed Dec. 9, 1980, Muller, LINDER & MAURER, now U.S. Pat. No. 4,393,687, the disclosure of which is hereby incorporated by reference.

The present invention relates to a combustion monitoring system, and more particularly to system which permits optical supervision of the flame occurring during combustion in the cylinder of an internal combustion engine. The combustion engine may be an Otto-type engine or a Diesel-type engine, and the sensor includes light guide to permit viewing of the actual combustion process which occurs upon ignition of the air-fuel mixture within the combustion chambers of the multi-cylinder engine.

BACKGROUND

Internal combustion engines are intermittenly operating in that the respective power strokes of the engines from the respective cylinders follow each other sequentially. Continuous rotation is obtained by the inertia flywheel to which the engine is coupled. Speed and torque are essentially continuous output values which are averaged, in time, by the inertia of the flywheel; the energy for supplying the output power is, however, generated in single, intermittently sequentially following combustion processes.

It is desirable to optimize the operation of internal combustion (IC) engines, particularly to reduce fuel consumption and, therefore, it is desirable to sense the combustion processes which occur in the various separate cylinders of a multi-cylinder IC engine separately, so that the single individual combustion processes can be appropriately controlled to obtain optimum overall output.

Controlling the combustion processes requires determination of the condition of combustion within the IC engine. Typical parameters which affect combustion are pressure and temperature. In case of ideal combustion, pressure and temperature within the cylinder can provide data regarding the overall process. Actually, the operation of IC engines is also determined by the chemical processes and reactions which occur, including changes in the composition of the fuel and the applied air, so that actual operation cannot be entirely sensed by merely sensing pressure and temperature; yet, observing pressure and temperature provides substantial, although not entirely complete but usually sufficient information regarding changes in the operating parameters over the cycle of operation in the respective cylinders of a multi-cylinder IC engine.

Determination of the temporal and spatial distribution of the combustion event is desirable to determine the exact condition of what happens during fuel injection, the data for ignition timing, and the like. Upon irregular combustion, which is referred to also as "knocking" of the engine, additional data are desirable.

Irregular combustion may result in knocking of the engine. Such knocking occurs under certain operating conditions. Knocking, as usually understood, is caused by oscillations within the audible frequency band of the compressed fuel-air mixture which is triggered by a shock wave. The heat transmission to the piston walls and cylinder walls of the engine is substantially increased during such oscillations. A thermal overload of the surfaces will result, so that knocking should be avoided. For most efficient operation of the engine, it is desirable to utilize the working range of the engine to the greatest possible extent and, therefore, the engine should be operated just below the "knocking limit". It is necessary to have some means which early and reliably indicate knocking or a tendency to knock, so that the operating parameters of the internal combustion (IC) engine can then be so controlled that the engine will operate just below the knocking limit.

Various types of sensors to determine knocking have been proposed. Mechanical systems which sense the transferred oscillations to the engine, for example using a piezoelectric sensor, are easily made but have the disadvantage that such systems are difficult to operate reliably and free from interference and stray signals, since they also may respond to externally generated jolts and oscillations which arise in the operation of a vehicle to which the engine may be coupled, for example over bad roads or corrugated roads.

It has also been proposed to sense and observe the combustion process by optical means. An optical sensor and background literature are described in the cross-referenced application, assigned to the assignee of the present application, Ser. No. 06/214,481, filed Dec. 9, 1980, MULLER et al, now U.S. Pat. No. 4,393,687. This application discloses a sensor which includes light guide fibers or filaments which are positioned to sense the combustion event optically, the light guides being connected to a photoelectric transducer which, in turn, provides output signals to a tuned or filter circuit which is responsive to or tuned to expected knocking frequency to provide an output signal if shock waves occurring within the combustion chamber are of a frequency which results in engine knocking. Of course, the signals derived from the photoelectric transducer can be processed in any desired manner. The aforementioned patent application further describes integration the light guide with a spark plug of an internal combustion engine; or to place light guides in the cylinder head gasket or seal, for eventual connection to photoelectric transducers.

The various previously proposed systems and arrangements to measure or monitor combustion, and particularly to monitor irregular combustion, were directed to determine the actual course of the combustion in any one combustion chamber. This may, however, lead to erroneous output results since different aging and operating conditions arise in respectively different cylinders of a multi-cylinder engine. The paths taken by inlet air or inlet air-fuel mixture to the respective cylinders are, typically, different for different cylinders and can differentially affect the combustion processes in the respective cylinders, depending for example on the design of the inlet manifold or the like.

THE INVENTION

It is an object to permit, simultaneously, observation of more than one combustion chamber of a multi-cylinder IC engine and to evaluate the combustion signals so obtained to permit monitoring of combustion events of individual cylinders.

Briefly, a plurality of optical sensors are provided, which can be constructed in accordance with known technology, for example including light guides exposed, optically, to the combustion events in the respective cylinders of the engine, the light guides from the respective sensors being coupled to an evaluation unit which has a sensing means and an interrogation element to interrogate the respective signals derived from the cylinders of the internal combustion engines, and to provide output signals which either are a combination of the signals representative of the respective combustion events or are separately provided; separation can be done in accordance with time-multiplexing by scanning the incoming signals in synchronism with the rotation of the engine.

The system has the advantage that, simultaneously, the combustion chamber or, rather, the cylinders, of a multi-cylinder internal combustion engine can be supervised, and the signals derived from the respective cylinders evaluated in an evaluation apparatus in which electrical signals associated with the specific cylinders, or averaged over the specific cylinders, can be formed.

The respective single signals can be derived by associating optical pick-ups with light guides forming part of the sensing elements of the respective cylinders, the optical pick-ups being separately connected to the evaluation unit. It is also possible to obtain a mixed or average signal, in which the various light guides derived from the respective cylinders are coupled together to provide an overall light output signal, for example and preferably by uniformly combining and mixing together the glass filaments forming the light guides.

If a combined single light signal is derived from all the output signal sensors, this combined signal can again be broken up into individual signals associated with the individual cylinders by providing a time-controlled steering circuit in which the combined light signal, sequentially, filters out the sequentially occuring light signals being transmitted by the light guide.

It is, of course, also possible to form a combined or joint signal from the single signals by combining the outputs derived from photoelectric sensors associated with the respective cylinders in an electrical combining circuit; opto-electrical transducers can be used which are directly positioned on sensors optically coupled to the respective cylinders, or which are remotely positioned, and receive their optical signals through light guides.

A timed steering circuit provides a simple, and hence preferred way of forming measuring or evaluation windows, in which the combustion events are sensed only within a predetermined time interval, in order to eliminate disturbance and interference signals from the desired output signal. The system permits testing of the output signals for appropriate relationship to the actual combustion event by providing a reference light which is connected to the evaluation signal in order to test and check proper operation of the light guides applying the signals thereto as well as of the optical and opto-electrical components therein.

DRAWINGS

FIG. 1 is a schematic representation of a four-cylinder IC engine with separate sensors;

FIGS. 2a and 2b are longitudinal and transverse cross sections, respectively, through a first embodiment of a plug connector for a light guide;

FIG. 3 is a top view of a second embodiment of a light guide connector;

FIG. 4 is a front view of a scanning disk;

FIG. 5 is a pictorial view of a light guide to form a composite signal;

FIG. 6 is a front view of a disk for time-analyzing output signals for use in conjunction with the system of FIG. 5;

FIG. 7 is a schematic illustration of a four-cylinder engine together with an arrangement to supply reference light; and FIG. 8 is a schematic illustration of an electrical combining circuit to receive a combined output signal from individually derived optical inputs.

The invention will be explained with reference to a four-cylinder IC engine which has combustion chambers 1a, 1b, 1c, 1d formed in an engine block 2. Windows 3a, 3b, 3c are formed in the combustion chambers, for example by introducing into the combustion chamber an optical sensor plug as described in the referenced application 06/214,481, or in accordance with the prior art described therein. Any other suitable optical sensor may also be used. Optical receivers 4a, 4b, 4c, 4d are connected or in optical light transfer relation to the windows 3a, 3b, 3c, 3d. Light guides, for example light guide filaments or cables 5a, 5b, 5c, 5d extend from the sensors 4a, 4b, 4c, 4d to a common light guide cable 6, which is connected to a lead-in plug 7 of an evaluation unit 8. Joining the light guides 5a, 5b, 5c, 5d in a common cable 6 can be done in various ways.

In accordance with one embodiment of the invention, the various light guide elements or filaments from the respective combustion chambers 1a, b, c, d remain optically separated from each other and are conducted to evaluation elements which are further described in connection with FIGS. 2, 3 and 4. In accordance with another embodiment, the light guide elements 5a, b, c, d are intermixed and joined optically, for example by placing the light guide fibers or filaments next to each other in a random, possibly spiraled and transposed arrangement, so that they will be uniformly distributed and, thereby, a common on conjoint collective signal is obtained optically within the cable 6, which is then evaluated in accordance with the invention as described in connection with FIGS. 5 and 6.

Embodiment of FIGS. 2–4: The cable 6 is conducted to a plug-in connector 7 which is secured to the evaluation unit 8 by a screw cap 9, as well known. The respective single individual light guide elements 5a, b, c, d are surrounded by a jacket 11. The jacket 11 can be introduced through a bore or opening 12 of the evaluation unit 8. A pin 13, guided in a longitudinal groove 14 of an extension boss on which the cap 9 is screwed, provides for defined orientation of the light guide cable 6 with respect to the evaluation unit 8. The light guides 5a, b, c, d, each, have a matrix 15 of light sensors 16a, 16b, 16c, 16d associated therewith—see FIG. 2b. As already referred to, the pin 13 in the longitudinal groove defines the orientation of the respective light guide elements 5a, b, c, d with respect to the evaluation unit 8, and thus positively associates a light sensitive element 16a, b, c, d of the matrix 15 to a respective light guide 5a, b, c, d, and thus to a predetermined combustion chamber or cylinder 1a, b, c, d of the IC engine 2.

The sensors 16a, b, c, d may, for example, be photo diodes, photo transistors or the like. The electrical signals derived therefrom can be obtained as separate signals associated with the individual cylinders or combustion chambers 1a, b, c, d. It is also possible, however, to form a common or composite signal—as described in connection with FIG. 8 below. In a four-cylinder engine, the light phenomena due to combustion will extend over between 70° to 80° of the crankshaft angle.

Serial ignition or firing of the cylinders, thus, will result in serial light emissions, without overlap of the respective signals. It is, thus, possible to join the individual signals of the elements 16a, b, c, d in a single composite output and to then reconstitute the respective separate single signals by a suitable interrogation or scanning device or circuit for subsequent serial processing and evaluation of the signals.

A further embodiment of the invention is illustrated in FIG. 3 in which a flat connector 17 is used. The light guides 5a, b, c, d terminate adjacent each other in the plug connector 17. Such an arrangement is preferable if the light output derived from the respective light guides 5a, b, c, d is to be evaluated only within predetermined regions of time, or measuring windows, separate for each combustion chamber 1a, b, c, d. In accordance with a feature of the invention, the arrangement of FIG. 4 is suitable which comprises a disk 19 formed with openings 21a, 21b, 21c, 21d in such a manner that the radial position of a respective opening is associated with one of the light guides as located in the connector 17, as clearly shown in FIG. 4. The circumferential extent of the openings 21a, b, c, d is so dimensioned that, upon rotation of disk 19, the exposure time during which any one of the light guides 5a, b, c, d, as located in the connector 17, is the same. If the plug unit 17 is located on one side of the disk 19, and four light sensitive elements are located on the other, in radial positions which match the windows 21a, b, c, d, rotation of the disk 19 will provide an output signal on the sensor elements which is positively associated with a predetermined crankshaft angle of the engine, and the signals will be separately derived associated with the individual combustion chambers.

In some systems, it is desirable to first form a common output signal, for example for ease of placing a single cable. The glass fibers forming the light guides 5a, b, c, d are then combined in a common cable 6', and uniformly intermixed-see FIG. 5. The terminal end of the cable 6', preferably, includes a collecting lens 23 which focuses the signals derived from the various light guides forming the cable 6' on a light sensitive element, such as an optical-electronic transducer 18. If it is desired to positively associate the light signals with one of the cylinders, or to measure the light signals only during a predetermined time window, a disk 20—see FIG. 6—is interposed between the lens 23 and the light sensitive element 18. The operation of the disk 20 corresponds to that of the disk 19 in FIG. 4, with the difference, however, that the openings 22a, 22b, 22c, 22d are all in the same radial position and have the same arcuate extent, since the signal is derived from the same physical location and applied only to a single light sensitive element 18. To be able to positively associate the signals with an individual combustion chamber 1a, b, c, d, a coding track 24 is positioned on the disk which has a different pattern associated with each one of the four quadrants, or a marker which specifically associates one of the windows with a predetermined one of the cylinders. The coding track 24 is scanned by a suitable scanning device—which may be optical or magnetic, or even mechanical—to provide for correct correlation of the respective openings 22a, b, c, d with the respective cylinders 1a, b, c, d. The common or composite output signal is thus again separated into the single signals by providing a single viewing window for each one of the combustion chambers.

Of course, the mechanical arrangement to form a viewing window illustrated in FIGS. 4 and 6 is only an example. Various other ways of associating signals with a specific combustion chamber can be devised, for example by forming time windows by electronic switching, or electronic multiplexing, as well known in time division technology.

Embodiment of FIG. 7: The arrangement is similar to that of FIG. 1, in which, however, in addition to the structure of FIG. 1, branches 25a, 25b, 25c, 25d are introduced to the light guides 5a, b, c, d, the branches being coupled together in a common cable 26 which terminates in a lens 27. A light source 28 provides light to lens 27 and hence to the cable 26 and to the light guides therein. In accordance with a feature of the invention, the light source 28 provides a reference light signal with which the optical transparency of the respective light guides 5a, b, c, d and cable 6, or 6', respectively, can be tested. The windows 3a, b, c, d are likewise included in this test since, if a reference signal is detected but no output signal from the combustion event, the conclusion is formed that the associated window is dirty, or that an interruption or malfunction in the element 3a has occurred.

The system for optical combination and, if desired, subsequent separation of the signals, can be carried out electrically as well as mechanically, by electrically joining and, later, separating the signals from light sensitive elements. Referring to FIG. 8: Four light sensitive elements 16'a, 16'b, 16'c, 16'd are all connected in parallel and to a load resistor $R_L$. A sensing voltage will occur across the load resistor which is a sum signal corresponding to the summing signal obtained by intermixing the light guide fibers 5a, b, c, d in the cable 6' (FIG. 5). This sum signal can be picked off from a terminal 32. The sum signal, however, can be separated out in its components, and the individual signals associated or corrulated with the cylinder of the IC engine 2 from which they were derived, by providing a time multiplex steering circuit 30, connected to the output of the load resistor $R_L$. The steering circuit 30 receives a synchronization signal from terminal 30', of predetermined duration, or corresponding to the time that the engine operates over a predetermined crankshaft angle starting, for example, from the ignition instant. Such a signal can be picked off in an Otto engine from the ignition distributor, or in a Diesel engine from a suitable transducer coupled to the injection pump. Terminal 31, thus, will have a series of signals appear thereat which, in serial mode, provide output information of the light phenomena during combustion in the respective cylinders. The light sensitive elements 16'a, b, c, d can be integrated or associated directly with the optical pick-ups 4a, b, c, d—FIG. 1. Alternatively, the light sensitive elements 16a, b, c, d—FIG. 2b—can be connected as shown in FIG. 8.

In effect, the circuit of FIG. 8 is an OR-gate, which provides serial output signals from a single output line if any one of the sensors 16'a, b, c, d provides a light output signal.

The reference light—see FIG. 7—can be separately sensed, for example by either pulsing the light source 28—which may be a light emitting diode (LED) to provide output signals just in advance or just after the time window, as determined by the synchronization signals at terminal 30', or by the arcuate length of the openings 21a, b, c, d (FIG. 4), or 22a, b, c, d (FIG. 6), respectively. Electronic evaluation of the reference and actual output signals can be done in accordance with any well known comparison or differential circuits which may have a threshold level which, if the difference threshold is exceeded, provides a warning or "malfunction" output signal. If the interruption is carried out optically, the respective disks 19, 20 (FIGS. 4, 6) may carry the openings for the reference source 28—which can then remain ON continuously—at another radial position which, additionally, can be used directly to provide the cylinder association markers 24 (FIG. 6) for scanning by an individually arranged pick-up, suitably located to evaluate the markings.

It is thus possible to monitor the combustion processes occurring in respective separate cylinders of a multi-cylinder IC engine. The separate individual signals derived from the separate individual combustion chambers, according to one embodiment of the invention, are joined to form a composite or common signal which is derived from mixing the respective single signals or, in accordance with another embodiment, by separately analyzing the respective single signal. Transformation of the optical signals into the easily processed electrical signals can be carried out in an evaluation unit remotely positioned and coupled to the light guides, or directly at the optical pick-up adjacent the cylinder heads, for sebsequent evaluation in a purely electrically operating evaluation unit. The optical or electrical signals can be separately processed for individual evaluation in accordance with desired criteria or processed after combination or subsequent separation into their entire or whole signals or in accordance with predetermined time windows. Separation can be carried out electrically—see FIG. 8, or mechanically—see FIGS. 4 and 6—by disks rotating in synchronism with the rotation of the main or power shaft of the IC engine. Of course, if desired, an overall or average signal can also be obtained, most simply electrically, by integrating the signals derived for example from terminal 32 (FIG. 8) over the period of time of a cycle of signals from the respective transducers 16′a, b, c, d or 16a, b, c, d, and then weighting the so derived signal by a suitable factor. The system, thus, permits versatility in testing, monitoring, and evaluating the combustion processes in an IC engine, during continuous on-the-road operation or, for example, for diagnostic and testing purposes.

Various changes and modifications may be made, and features described in connection with any one of the embodiments may be used with any of the others within the scope of the inventive concept.

We claim:

1. Combustion monitoring system for a multi-cylinder internal combustion engine (2) comprising
   a plurality of optical sensors (4a, 4b, 4c, 4d) positioned in optically coupled relation to the combustion chambers (1a, 1b, 1c, 1d) of the cylinders of the engine, and providing separate optical combustion sensing signals; and
   an evaluation means (8) having the sensing signals applied thereto and including
   sensing means (16a, 16b, 16c, 16d; 16′a, 16′b, 16′c, 16′d) positioned for sensing the respective sensing signals being applied to the evaluation means and providing output signals associated with the respective combustion chambers, and means (13, 14; 19, 20, 30) positively associating the output signals from the evaluation means (8) with the optical sensing signals derived from the optical sensors;
   including means (6′; R$_L$) for combining the separate combustion sensing signals and for forming an output signal available at a single terminal;
   and wherein the means (20, 30) for positively associating the output signals with the optical sensing signals comprises scanning or signal steering means (20, 22a, b, c, d; 30, 30′) synchronized with rotation of the IC engine for temporally separating the combined signals.

2. System according to claim 1, wherein the scanning or steering means comprises a timing means (20, 30) associating the combined sensing signal by time correlation of the sensed output signals.

3. System according to claim 1, wherein the sensors include optical pick-up means and light guides (5a–d), the light guides being combined to form a common light guide cable in which the light guides are intermixed to provide a single light output from the cable, the single light output being common to a plurality of sensors being connected to the evaluation means (8).

4. System according to claim 3, wherein the means for positively associating the output signal from the evaluation means comprises means (20, 30) defining a time window and separating the combined output, in time, into individual output signals, each of the duration of the time window.

5. System according to claim 4, wherein the means defining a time window comprises a disk (20) formed with openings (22a–d) therein, rotating in synchronism with rotation of the engine (2) and positioned for selectively blocking and permitting passage from the light guide cable (6′) to the sensing means (16).

6. System according to claim 4, wherein the means positively associating the output signal with the signal derived from the optical sensors comprises an electronic multiplex circuit (30) connected for selectively blocking or passing of signals from the light guide cable (6′) in synchronism with rotation of the engine (2).

7. System according to claim 1, wherein the means positively associating the output signal with the signal derived from the optical sensors comprises an electronic multiplex circuit (30) connected for selectively blocking or passing of signals from the light guide cable (6′) in synchronism with rotation of the engine (2).

8. System according to claim 1, wherein the optical sensors (4a–d) each include an optical pick-up (16′a–d) providing electrical output signals, the electrical output signals being connected to said evaluation means (8).

9. System according to claim 8, wherein the output signals derived from the optical-electrical pick-ups (16′a–d) are combined in a single electrical signal;
   and the means positively associating the output signal with the optical sensing signal derived from the optical sensors associated with the individual cylinders (1a–d) of the engine (2) comprises a time multiplex circuit (30) coupled to the combined signal and operating in time synchronism with rotation of the engine (2).

10. Combustion monitoring system for a multi-cylinder internal combustion engine (2) comprising
    a plurality of optical sensors (4a, 4b, 4c, 4d) positioned in optically coupled relation of the combustion chambers (1a, 1b, 1c, 1d) of the cylinders of the engine, and providing separate optical combustion sensing signals; and
    an evaluation means (8) having the sensing signals applied thereto and including sensing means (16a, 16b, 16c, 16d; 16'a, 16'b, 16'c, 16'd) positioned for sensing the respective sensing signals being applied to the evaluation means and providing output signals associated with the respective combustion chambers, and means (13, 14; 19, 20, 30) positively associating the output signals from the evaluation unit (8) with the optical sensing signals derived from the optical sensors;

wherein the optical sensors (4a-d) include light guides (5a-d), one each associated with an individual cylinder (1a-d) of the engine (2), and connected to the evaluation means (8);

the sensing means comprises electro-optical transducer means (16a-d; 16'a-d) individually converting the outputs from the individual light guides to electrical signals;

and an optical coupler (17) is provided connected to the individual light guides, the optical coupler positioning the light guides in predetermined location in a predetermined pattern.

11. System according to claim 10, wherein the means for positively associating the output signal from the evaluation means (8) comprises a disk (19) rotating in synchronism with operation of the engine (2) and having openings (21a-d) formed therein positioned to permit passage of light from only a particular one of the light guides of the terminal (17), the sensing means being optical-electrical transducers placed to receive light from only one of the respective openings.

12. System according to claim 11 wherein the angular extent of the openings (21a-d) is limited to establish a time window for passage of light to the sensing means upon rotation of the disk.

13. System according to claim 10, further comprising a reference light source (28) and light guide means (26, 27) coupled to the light guides (5a-d) form the optical sensors (4a-d) to provide a reference and monitoring signal.

* * * * *